United States Patent [19]
Kleeberg et al.
[11] 3,902,902
[45] Sept. 2, 1975

[54] METHOD OF FORMING A PHOTO-CROSS-LINKED INSULATOR FILM

[75] Inventors: Wolfgang Kleeberg, Erlangen; Roland Rubner, Roettenbach upper Forchheim; Eberhard Kuehn, Erlangen, all of Germany

[73] Assignee: Siemens Aktiengesellschaft, Berlin & Munich, Germany

[22] Filed: Mar. 25, 1974

[21] Appl. No.: 454,180

Related U.S. Application Data

[62] Division of Ser. No. 264,569, June 20, 1972, Pat. No. 3,832,187.

[30] Foreign Application Priority Data

June 22, 1971 Germany ........................... 2130904

[52] U.S. Cl. .................... 96/35.1; 96/36.2; 96/38.2; 96/38.4; 96/115 R

[51] Int. Cl.$^2$ .......................................... G03C 1/70

[58] Field of Search ............ 96/115 R, 115 P, 35.1, 96/36.2

[56] References Cited

UNITED STATES PATENTS

| | | | |
|---|---|---|---|
| 2,641,576 | 6/1953 | Sachs et al. | 204/159.23 |
| 2,722,512 | 11/1955 | Crandall | 204/159.23 |
| 2,921,006 | 1/1960 | Schmitz et al. | 204/159.15 |
| 3,249,656 | 5/1966 | Kalinowski | 260/78.4 D |
| 3,424,729 | 1/1969 | Lanauia et al. | 260/88.1 R |
| 3,462,267 | 8/1969 | Giangualano et al. | 96/33 |
| 3,622,321 | 11/1971 | Smets et al. | 96/115 R |

FOREIGN PATENTS OR APPLICATIONS

| | | |
|---|---|---|
| 1,541,524 | 10/1968 | France |

*Primary Examiner*—Ronald H. Smith
*Attorney, Agent, or Firm*—Hill, Gross, Simpson, Van Santen, Steadman, Chiara & Simpson

[57] ABSTRACT

A single-phase, solid film-forming photo-cross-linkable resinous system comprised of a resin component containing allyl-ester groups and a resin component containing at least one N-maleic imide group with a ratio of the allyl double bond equivalent to the maleic imide double bond equivalent at least equal to 1. the resinous systems are especially useful as compositions for use in photoprinting applications, for example, as in production of printed circuits.

3 Claims, No Drawings

METHOD OF FORMING A PHOTO-CROSS-LINKED INSULATOR FILM

This is a division, of application Ser. No. 264,569, filed June 20, 1972, now U.S. Pat. No. 3,832,187.

BACKGROUND OF THE INVENTION

1. Field of the Invention

The invention relates to single-phase, film-forming, photo-cross-linkable systems and more particularly to photo-cross-linkable resin materials that include a component having allyl-ester groups useful as a photo-negative material characterized by excellent light sensitivity and excellent insulator properties.

2. Prior Art

Photo-negative lacquer materials, i.e. photo-cross-linkable synthetic compositions based on polycinnamates of polyvinyl alcohol are known. The utility of such lacquer materials is limited to applications wherein a cross-link layer thereof simply functions as an intermediate or temporary protective covering and thereafter is completely removed.

Cross-linked lacquer materials composed of epoxy polycinnamate resins are known, for example, see German Pat. No. 1,104,339 and German Auslegeschrift No. 1,108,078; lacquer materials composed of allyl-ester resins are also known, for example, see U.S. Pat. Nos. 3,462,267 and 3,376,138 or South African Pat. No. 05,209. Such known lacquer materials are tailored for particular characteristics, such as age resistance, increased chemical resistance, low shrinkage, etc.

All of the described photo-cross-linkable resins are disadvantageous in that they are only sufficiently light-sensitive at relatively thin films or layers in thicknesses up to about 1 to 5$\mu$ (microns) and fail to exhibit sufficient light sensitivity in relatively thicker films or layers. The prior art epoxy polycinnamate resins require careful storage and additions of polymerization inhibitors to insure constant processing properties over fairly extended periods of time. The prior art allyl-ester resins require the inclusion of relatively large amounts of photo-sensitizer materials.

Photo-polymerizable resinous materials that include inert organic carrier polymers and monomeric acrylic acid or methacrylic acid derivatives are known and have sufficient light sensitivity even in relatively thicker layers, for example, see German Auslegeschrift No. 1,295,192. Such acrylic-containing resinous materials require the addition of polymerization inhibitors to extend their shelf life. Further, oxygen must be kept away from photopolymerizable (or cross-linkable) layers composed of such acrylic containing resinous materials by a special device or by means of additions, such as tin salts, in order to insure that the original light sensitivity characteristics remain unchanged. The practical application of such acrylic-containing resinous materials is often limited to the heretofore mentioned intermediate protective function because of the embrittling of cross-link layers thereof during the aging process.

SUMMARY OF THE INVENTION

The invention provides a single-phase, photo-cross-linkable synthetic system that includes a solid film-forming resin material having allyl-ester groups therein as a cross-linking agent and a component having one or several N-maleic imide groups, with a ratio between the allyl double bond equivalent and the maleic imide double bond equivalent equal to or greater than 1 and preferably in the range of 1.5 to 30. In preferred embodiments, relatively small amounts (generally less than 1% by weight of the entire system) of a photo-sensitization material are added to such resin materials. The film-forming synthetic resin materials of the invention exhibit fast cross-linking rates, even in layer thicknesses greater than 10$\mu$.

The synthetic systems of the invention are useful in providing coatings that are photo-cross-linkable by exposure to actinic light to form a cross-linked layer and which is exposed by a solvent to form a pattern having clear outlines. The cross-linked material exhibits excellent insulator properties, i.e. outstanding stability over prolonged time periods, high electrical surface and transition resistance, low water absorption and swelling, etc.

The allyl-ester containing resin components of the invention include prepolymers and pre-copolymers formed by the partial polymerization of (a) $\alpha,\beta$-olefinic unsaturated carboxylic allyl-esters, such as allyl acrylate or allyl methacrylate; and (b) dicarboxylic diallyl acids, such as diallyl orthophthalate or diallyl isophthalate. In addition, film-forming polyadducts and polycondensates obtained by base catalyzed additions of aliphatic, aromatic or heterocyclic dicarboxylic acids containing allyl-ester groups, such as succinic acid, glutaric acid, hexahydrophthalic acid, tetrahydrophthalic acid, phthalic acid monoallylester, etc. to hydroxy-free aromatic or aliphatic bisglycidols, such as bisphenol-A-bisglycidol ether, and reactions of the so-obtained dihydroxy-dicarboxy acid esters in accordance with known methods, preferably with diisocyanate to obtain allyl-ester-containing polyurethanes. The dihydroxy-dicarboxy acid esters are also reacted with suitable dicarboxylic acid derivatives, such as dicarboxylic acid halogenides to obtain corresponding allyl-ester containing polyesters.

The N-maleic imide containing resin compounds of the invention include aliphatic phthalates; aromatic and heterocyclic maleic imides; such as N-cyclohexylmaleic imide; N-phenylmaleic imides; N-phenylmaleic imides having ortho-substituted benzene rings (preferably with an alkyl group), as well as compounds having two or more N-maleic imide groups obtained from select polyfunctional amines; such as hexamethylene diamine; p-phenylene diamine; p,p'-diaminodiphenyl or p,p'-diaminodiphenylmethane reacted with maleic acid anhydride in accordance with known methods.

DESCRIPTION OF THE PREFERRED EMBODIMENTS

The invention provides a single-phase, photo-cross-linkable, film-forming synthetic resin material generally comrpised of a component having allyl-ester groups and a component having at least one N-maleic imide groups with a ratio of the allyl double bond equivalent to the maleic imide double bond equivalent at least equal to 1 and preferably in the range of about 1.5 to 30.

In preferred embodiments, small amounts of generally less than 1% by weight of the entire system of select photo-sensitizers are included within the system.

The compounds containing the N-maleic imide groups that are utilized in the invention simultaneously function as a co-polymerizable component and as a photo-initiator component.

The photo-cross-linked coatings obtained by exposure of a layer composed of the resinous systems of the invention to actinic light provide sharp patterns having clear outlines that are readily revealed by a solvent etching process and are characterized by outstanding insulator properties, i.e. high stability over prolonged time periods, high electrical surface and transition resistance, and low water absorption and swelling.

Films produced from the resinous systems of the invention are superior to films formed of prior art combinations of allyl-ester resins or epoxy polycinnamate resins having sensitizers therein. The comparison is based on films of a thickness of about 15$\mu$ and exposure times of about 5 to 10 minutes and their cross-linkage caused resistance to suitable developing solvents.

An especially attractive feature of the resinous systems of the invention is that exposed areas of a layer of such systems can be further cross-linked after initial exposure, in a subsequent secondary or dark reaction. Accordingly, the exposure time required to achieve sufficient insolubility of selected areas of a layer formed of the resinous systems of the invention is considerably shortened.

Another attractive feature of the resinous systems of the invention is that exposed areas of a layer thereof can be further cross-linked by heat treatment at about 50° C., after completion of the initial exposure while the solubility characteristics of the unexposed areas thereof remain substantially unchanged.

The resinous components containing an allyl-ester group utilized in the invention are obtained by prior art means from suitable materials. For example, a polymerization reaction forming such materials is continued until shortly before gelatinization and then terminated and soluble polymer fractions and monomer fractions are separated therefrom, for example, as set forth in U.S. Pat. No. 3 030 341. The allyl-ester containing resin components of the invention are selected from the group comprised of pre-polymer and precopolymer materials containing allyl-ester groups which are obtained by the partial polymerization of (a) $\alpha,\beta$-olefinic unsaturated carboxylic acid allyl-esters, such as allyl acrylate or allyl methacrylate and (b) dicarboxylic acid diallyl esters, such as diallyl orthophthalate or diallyl isophthalate.

In addition, the preferred allyl-ester containing compounds are also selected from the group comprising film-forming polyadducts and polycondensates having allyl-ester groups therein. Such polyadducts and polycondensates are obtained by base-catalyzed additions of acidic allyl-esters selected from the group comprising aliphatic, aromatic or heterocyclic dicarboxylic acid allyl-esters, such as succinic acid, glutaric acid, hexahydrophthalic acid, teetrahydrophthalic acid, phthalic acid monoallyl-ester, etc., to hydroxyl-free aromatic or aliphatic biaglycidol ethers, such as bisphenol-A-biaglycidol ether and subsequent reactions of the so-obtained dihydroxy-di-carboxy acid esters in accordance with known methods (preferably with diisocyanates) to obtain allyl-ester containing polyurethanes. The dihydroxy-di-carboxy acid esters are also reacted with suitable dicarboxylic acid derivatives, such as dicarboxylic acid halogenides to obtain corresponding allyl-ester containing polyesters.

The resinous components having a N-maleic imide groups used in forming the resin materials of the invention are selected from the group of alphatic, aromatic or heterocyclic maleic imides; such as N-cyclohexylmaleic imide; N-phenylmaleic imides having ortho-substituted benzene rings (preferably with an alkyl group); as well as compounds having two or more N-maleic imide groups obtained from corresponding poly-functional amines, such as hexamethylene diamine; p-phenylenediamine; p,p'-diaminodiphenyl or p,p'-diaminodiphenylmethane reacted with maleic acid anhydride in accordance with known procedures.

In preferred embodiments, the photo-sensitization is achieved by inclusion of conventional photosensitizers, such as Michler's Ketone (4,4'-bisdimethylamino benzophenone); 4,4'-bisdiethylamino benzophenone; 2-tert.-butyl-9,10-anthraquinone; 1,2-benzo-9,10-anthraquinone; 2-keto-3-methyl-1,3-diazobenzoanthrone or p-nitrodiphenyl and subjecting layers of such resinous systems to an Hg lamp as a light source.

The photo-cross-linkable resinous systems of the invention can be subjected to actinic light from any source or type. A select light source preferably, although not necessarily, supplies an effective amount of ultra-violet radiation.

Exposure of a layer composed of resin materials of the invention to actinic light produces a cross-linked coating or cross-linked photo-negative copy having sharp outlines that can be precisely revealed by solvent etching. Such cross-linked coatings comprise an excellent insulator material with outstanding insulator properties, i.e. high age resistance, high electrical surface and transition resistance, low water absorption and swelling, etc.

The insulator material layers obtained from the resinous systems of the invention are produced from readily accessible and economically producible components in a relatively simple manner. Such layers may, in accordance with prior art methods, include a nucleation layer for firmly anchoring galvanic coatings thereon. Accordingly, preconditioning means are included in the resin materials of the invention to provide broad and technically advantageous uses for the photo-cross-linkable insulator materials derived from the invention. For example, the resin materials of the invention are advantageously utilized in the production of miniaturized layer circuits; advantageously utilized in the production of printed circuits having galvanically (electrolytically) produced conductor lines; advantageously utilized in the production of miniaturized insulator layers on electrically conductive and/or semiconductor and/or insulating substrate materials, as well as being advantageously utilized in the production of optically integrated image memories. In addition, the resin materials of the invention are useful in prior art applications, such as set forth at column 3 of German Auslegeschrift No. 1,295,192 in producing qualitatively high-value printed forms.

In order to further illustrate and not limit the invention, the following exemplary embodiments and demonstrations are set forth:

EXAMPLE I

Demonstration A

An amount of a diallyl-phthalate pre-polymer available under the trade name "DAPON-35" from Ciba AG comprising 50 portions by weight was dissolved in chloroform, along with 0.5 portions by weight of N-phenylmaleic imide and 0.5 portions by weight of Michler's Ketone. The resultant solution was filtered and spread, as by whirling, onto aluminum foils as a smooth continuous film. After the solvent was evaporated, the films had a thickness of 15$\mu$.

The films were exposed to a 200-watt maximum pressure mercury lamp at a distance of 20 cm for various periods of time. The exposed films were submerged in a suitable solvent (i.e., a solvent that completely dissolves the unexposed film in less than 1 minute) for a comparative evaluation of their solubility behavior on the basis of their exposure period. The time during which such films remained unchanged in the solvent baths was noted. All of such results are set forth in Table I below.

Demonstration B

For comparative evaluation, a polyhydroxy pre-polymer, such as a phenoxy resin available under the trade designation "0717" from the Ruetger-Werke (obtained by polyadditions of bisphenol A with a bisphenol-A-bisglycidol ether) was completely esterified with cinnamic chloride. Fifty portions by weight of such "0717" polycinnamate was dissolved in chloroform, along with 1.25 portions by weight of Michler's Ketone and formed into 15$\mu$ thick films and exposed, subjected to solvents, etc. as set forth in Demonstration A. The results are set forth in Table I below.

Demonstration C

In accordance with U.S. Pat. No. 3,462,267 or South African Pat. No. 05,209, a 50 portion by weight of "DAPON 35" (a trade name of Ciba AG for a diallylphthalate pre-polymer), a 1.7 portion by weight of xanthone, a 0.4 portion by weight of benzene and a 0.4 portion by weight of Michler's Ketone were dissolved in chloroform. The resultant solution was formed into 15$\mu$ thick films and exposed, subjected to solvents, etc. as set forth in Demonstration A. The results are set forth in Table I below.

TABLE I

Solubility behavior (measurements were taken 5 minutes after complete exposure)

| Stability in Accordance with Exposure Time | Demo. I | Demo. II | Demo III |
|---|---|---|---|
| 5 Min. | 4.5 Min. | 30 Sec. | 1.0 Min. |
| 10 Min. | 9.0 Min. | 2.5 Min. | 2.5 Min. |
| Solvents | Benzene | Xylene | Benzene |

EXAMPLE II 50 portions by weight of "DAPON 35", a 3.75 portion by weight of N-phenyl-maleic imide and a 0.54 portion by weight of Michler's Ketone were dissolved in chloroform and, as set forth in Demonstration A, formed into 15$\mu$ thick films.

Solubility behavior (measurement made 5 minutes after completion of exposure).

Solvent: Benzene
Stability after exposure period

| | (Exposure Period) | (Stability) |
|---|---|---|
| (a) | 5 Min. | 4 Min. |
| (b) | 10 Min. | 12 Min. |

The stability behavior of the above system was changed after completion of the initial exposure period by a subsequent dark reaction:

| Storage Time (after exposure) | Exposure Time 5 Min. | 10 Min. |
|---|---|---|
| 5 Min. | 4 Min. (stable) | 12 Min. (stable) |
| 20 Hrs. | 9 Min. (stable) | 34 Min. (stable) |
| 44 Hrs. | 16 Min. (stable) | 35 Min. (stable) |

The exposed films were heated at 50° C. for 1 hour and the solubility behavior of the exposed portions changed while the solubility behavior of the unexposed portions remain constant.

Stability after exposure period

| | (Exposure Period) | (Stability) |
|---|---|---|
| (a) | 5 Min. | 4 Min. |
| (b) | 10 Min. | 12 Min. |
| | Additional Heating 1 Hr. at 50° C. | (Achieved Stability) |
| (a) | | 6 Min. |
| (b) | | 26 Min. |

The electrical transition (volume) resistance of the very hard, cross-linked films was measured at 2 · $10^{16}\Omega$·cm (in accordance with German Industrial Standards procedure DIN 53,482); the electrical surface resistance (measured with a 40$\mu$ thick film on a polyethylene substrate) was greater than 5 · $10^{15}\Omega$; the DK (dielectric constant) is 2.9 in accordance with DIN 53,483 (measured at $10^3$ Hz).

EXAMPLE III 50 portions by weight of "DAPON 35", a 0.5 portion by weight of N-o-tolylmaleic imide and 0.5 portion by weight of Michler's Ketone were dissolved in chloroform and formed into 15$\mu$ thick films as set forth above.

Solubility behavior (measurements made 5 minutes after completion of exposure).

Solvent: Benzene
Stability after exposure period

| | (Exposure Period) | (Stability) |
|---|---|---|
| (a) | 5 Min. | 6 Min. |
| (b) | 10 Min. | 11 Min. |
| | Additional heating 1 Hr. at 50° C. | (Achieved Stability) |
| (a) | | 9 Min. |
| (b) | | 17 Min. |

EXAMPLE IV 50 portions by weight of "DAPON 35", a 3.75 portion by weight of N-o-tolylmaleic imide and a 0.5 portion by weight of Michler's Ketone were dissolved in chloroform and formed into 15$\mu$ thick films as set forth above.

Solubility behavior (measurements made 5 minutes after completion of exposure).

Solvent: Benzene
Stability after exposure period

| (Exposure Period) | (Stability) |
|---|---|

-Continued

| | | |
|---|---|---|
| (a) | 5 Min. | 12 Min. |
| (b) | 10 Min. | 24 Min. |

EXAMPLE V 50 portions by weight of "DAPON 35", a 3.75 portion by weight of N-o-tolylmaleic imide were dissolved in chloroform and formed into 12$\mu$ thick films as set forth above.

Solubility behavior (measurements made 5 minutes after completion of exposure).

Solvent: Benzene
Stability after exposure period

| (Exposure Period) | (Stability) |
|---|---|
| 20 Min. | 2.5 Min. |

EXAMPLE VI 50 portions by weight of "DAPON 35", a 0.5 portion by weight of N,N'-p,p'-diphenylmethane-bis-maleic imide and a 0.5 portion by weight of Michler's Ketone were dissolved in chloroform and formed into 15$\mu$ thick films as set forth above.

Solubility behavior (measurements made 5 minutes after completion of exposure).

Solvent: Benzene
Stability after exposure period

| | (Exposure Period) | (Stability) |
|---|---|---|
| (a) | 5 Min. | 5 Min. |
| (b) | 10 Min. | 9 Min. |

EXAMPLE VII 50 portions by weight of "DAPON 35", a 3.75 portion by weight of N-cyclohexylmaleic imide and a 0.5 portion by weight of Michler's Ketone were dissolved in chloroform and formed into 15$\mu$ thick films as set forth above.

Solubility behavior (measurements made 5 minutes after completion of exposure).
Solvent: Benzene
Stability after exposure period

| | (Exposure Period) | (Stability) |
|---|---|---|
| (a) | 5 Min. | 2.5 Min. |
| (b) | 10 Min. | 8.5 Min. |

EXAMPLE VIII 50 portions by weight of a diallyl isophthalate prepolymer available under the trade name "DAPON M" from Lehmann & Voss, Hamburg, Germany, a 3.75 portion by weight of N-o-tolylmaleic imide and a 0.5 portion by weight of 2-tert. -butyl-9,10-anthraquinone were dissolved in toluol (commercial toluene) and formed into 11$\mu$ thick films as set forth above.

Solubility behavior (measurements made 5 minutes after

-Continued completion of exposure).

Solvent: Xylene
Stability after exposure period

| | (Exposure Period) | (Stability) |
|---|---|---|
| (a) | 5 Min. | Greater than 45 Min. |
| (b) | 10 Min. | Greater than 45 Min. |

EXAMPLE IX 50 portions by weight of allyl-methacrylate prepolymer, a 3.75 portion by weight of N-o-tolylmaleic imide and a 0.5 portion by weight of Michler's Ketone were dissolved in chloroform and formed into 15$\mu$ thick films as set forth above.

Solubility behavior (measurements made 5 minutes after completion of exposure).

Solvent: Cyclohexanone (ethyl propyl ketone)
Stability after exposure period

| | (Exposure Period) | (Stability) |
|---|---|---|
| (a) | 5 Min. | 5 Min. |
| (b) | 10 Min. | 16 Min. |

EXAMPLE X

Hexahydrophthalic monoallyl ester and a 3% excess of bisphenol-A-bisglycidol ether (Rutapox 0162) were reacted in the presence of 1.25% of p,p'-bis(dimethylamino-diphenylmethane) for 4 days at 120°C. and then for 1 day at 200°C. The acid consumption was measured to arrive at the number of hydroxyl functions formed. A saturated toluene solution of 70 % of the amount of terephthalate acid dichloride equivalent to such acid consumption was titrated into a toluene solution of the diol addition product (4:1) containing a 5 % excess of pyridine (in respect to the acid chloride). The solution was reacted at room temperature overnight and then further reacted for 1 hour at 70°C., filtered and an allyl-ester resin precipitated in a mixture of methanol/water (85:15) and placed into pure methanol.

50 portions by weight of such allyl-ester resin, a 0.5 portion by weight of N-phenylmaleic imide and a 0.5 portion of Michler's Ketone were dissolved in chloroform and formed into 15 $\mu$ thick films as set forth above.

Solubility behavior (measurements made 5 minutes after completion of exposure).

Solvent: Xylene
Stability after exposure period

| | (Exposure Period) | (Stability) |
|---|---|---|
| (a) | 5 Min. | 4 Min. |
| (b) | 10 Min. | 20 Min. |

EXAMPLE XI 50 portions by weight of the allyl-ester resin prepared in accordance with Example X, a 3.75 portion by weight of N-phenylmaleic imide and a 0.54 portion by weight of Michler's Ketone were dissolved in chloroform and formed into 15$\mu$ thick films as set forth above.

| Solubility behavior (measurements made 5 minutes after completion of exposure). | | |
|---|---|---|
| Solvent: Xylene | | |
| Stability after exposure period | | |
| | (Exposure Period) | (Stability) |
| (a) | 5 Min. | 3.5 Min. |
| (b) | 10 Min. | Greater than 20 Min. |

The full oxygen absorption of the cross-linked films at 100°C. in pure $O_2$ was equal to 0 during a 1,000 hour period; accordingly, the cross-linked films derived from the invention are extremely stable to oxidation. In comparison to the resinous materials of Example I through Example VII (resins based on "DAPON 35") the instant cross-linked films were also scratch-resistant and substantially more elastic. The electrical transition (volume) resistance was measured at $3 \cdot 10^{16}\Omega \cdot$ cm in accordance with DIN 53,482; the electrical surface resistance (measured with a 60$\mu$ thick film on a polyethylene substrate) was greater than $10^{16}\Omega$, the DK (dielectric constant) of such films is 3.0 in accordance with DIN 53,483 (measured at $10^3$ Hz).

EXAMPLE XII

In accordance with Example X, hexahydrophthalic monoallyl ester was reacted with bisphenol-A-diglycidol ether, diluted with an equal volume of absolute toluene and provided with 90% of the required amount of diphenylmethane-4,4'-diisocyanate (Desmodur 44). The resultant mixture was heated to 115° C. for 100 minutes and the reaction then terminated by addition of dibutylamine in an amount corresponding to the remaining isocyanate. An allyl-ester containing polyurethane resin was precipitated in methanol, dissolved and re-precipitated.

50 portions by weight of such allyl-ester containing polyurethane resin, a 3.75 portion by weight of N-o-tolylmaleic imide and a 0.5 portion by weight of Michler's Ketone were dissolved in chloroform and formed into 15$\mu$ thick films as set forth above.

| Solubility behavior (measurements made 5 minutes after completion of exposure). | | |
|---|---|---|
| Solvent: Toluene | | |
| Stability after exposure period | | |
| | (Exposure Period) | (Stability) |
| (a) | 5 Min. | 5 Min. |
| (b) | 10 Min. | 25 Min. |

The instant cross-linked films were scratch-resistant and, in comparison with the film materials of Example X and Example XII, more elastic. The electrical transition resistance was $4 \cdot 10^{15}\ \Omega \cdot$ cm in accordance with DIN 53,482; the electrical surface resistance (measured with a 40$\mu$ thick film on a polyethylene substrate) was greater than $5 \cdot 10^{15}$, the DK is 3.3 in accordance with DIN 53,483 (measured at $10^3$ Hz).

The Examples illustrate the N-maleic imide group-containing compounds form quickly cross-linked insulator layers by a photo-initiated copolymerization reaction with allyl-ester group-containing compounds. The insulator layers are characterized by outstanding oxidation stability and excellent insulator properties.

A photo-negative copy of a pattern provided onto a layer of the resin materials of the invention are quickly etched with sharp outlines by a select solvent.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, except as is set forth and defined in the hereto-appendant claims.

We claim:

1. A method of forming a photo-cross-linked insulator film comprising:

applying a layer of a single-phase, solid film-forming, photo-cross-linkable synthetic resin material onto a substrate, said resin material comprised of a resin component having allyl-ester groups therein and a resin component having at least one N-maleic imide group therein, with the ratio of the allyl double bond equivalent to the maleic imide double bond equivalent being in the range of 1.5 to 30;

selectively exposing areas of said layer to actinic light so as to photo-cross-link said resin material at the exposed areas of said layer; and subjecting the selectively exposed layer to a suitable solvent for removal of only unexposed areas of said layer.

2. A method of forming a photo-cross-linked insulator film as defined in claim 1 including subjecting the selectively exposed layer to a heat treatment for further cross-linking of the resin material in the exposed areas of such layer.

3. A method of forming a photo-cross-linked insulator film as defined in claim 1 including subjecting the selectively exposed layer to a dark reaction for further cross-linking of the resin material in the exposed areas of such layer.

* * * * *